United States Patent [19]

Dola

[11] Patent Number: 4,562,311
[45] Date of Patent: Dec. 31, 1985

[54] TELEPHONE NETWORK INTERFACE DEVICE

[75] Inventor: Frank P. Dola, Hudson, Fla.

[73] Assignee: AMP Incorporated, Harrisburg, Pa.

[21] Appl. No.: 518,575

[22] Filed: Jul. 29, 1983

[51] Int. Cl.[4] ................ H01R 33/54; H04M 1/00
[52] U.S. Cl. .................... 179/158 R; 179/175.3 R;
200/51.12; 339/75 M
[58] Field of Search ............. 179/175.3 R, 175.3 F,
179/158 R, 178, 81 R; 200/51.09, 51.1, 51.12,
51.02, 51 R, 51.03; 339/91 R, 75 M, 65;
324/158 F

[56] References Cited

U.S. PATENT DOCUMENTS 4,488,008 12/1984 Dellinger et al. ............ 179/81 R
4,488,011 12/1984 Rogers ........................ 179/175.11

*Primary Examiner*—Thomas W. Brown
*Attorney, Agent, or Firm*—Russell J. Egan; Robert W. Pitts

[57] ABSTRACT

Network interface device in the form of a switch comprises a dielectric base with a cover slidably mounted thereon. Parallel first and second spade terminals upstanding from said base alternate in a first row. The first terminals are part of contacts connected to subscriber's wiring, the second terminals are part of contacts connected to network wiring. Parallel third and fourth spade terminals upstanding from said base alternate in a second parallel row. The third terminals are integral with contacts having second terminals thereon, and the fourth terminals are part of contacts connected to spring contacts in a test jack. Four pairs of first and second terminals lie directly opposite four pairs of respective third and fourth terminals. Bridging contacts in a third parallel row on the cover connect first and second terminals when the cover is closed, connecting the network to the subscriber's wiring. When the cover is open, the bridging contacts connect third and fourth contacts, the test jack is exposed, and the network wiring is connected thereto while the subscriber's wiring is disconnected.

4 Claims, 7 Drawing Figures

TELEPHONE NETWORK INTERFACE DEVICE

FIELD OF THE INVENTION

The present invention relates to a switched connector for connecting two groups of wires, particularly telephone wires.

BACKGROUND OF THE INVENTION

Recent deregulation of the telephone companies requires that premises wiring may be customer owned and that the serving telephone company may provide a network interface device separating the company's wiring from the subscriber's wiring. The Electronic Industries Association recommends that a device be provided for connecting single-line service, and that two-line service should be provided at the network interface as two single-line services. The device should be foolproof and is intended to provide a means for isolating troubles between terminal equipment, premises wiring, and public network facilities. The device should provide a standard RJ11 jack for testing purposes, and should be weatherproof for outside mounting.

SUMMARY OF THE INVENTION

The network interface device of the present invention meets the design criteria by providing a single-pole double-throw swtich on each of the four incoming signal wires from the phone company network. In the normally closed position the switches connect the network to the subcriber's wires; in a second or test position the network is connected to a test jack while the subcriber's wiring is disconnected. This is accomplished by three sets of four stamped and formed contacts mounted in a dielectric base, and a set of four bridging contacts mounted in a cover which slides on the base. Each of a set of four network contacts has wire termination means for connecting a network wire, and two terminal tabs upstanding from the base and lying in respective parallel first and second rows. Each of a set of four premises contacts has wire termination means for connecting a premises wire, and an upstanding terminal tab lying in the first row. The premises tabs alternate with network tabs to form four pairs which are bridged by respective bridging contacts when the cover is closed. Each of a set of four test contacts has a spring contact at one end and an upstanding terminal tab lying in the second row. The test tabs alternate with network tabs to form four pairs which are bridged by respective bridging contacts when the cover is open, which exposes a test jack housing the spring contacts.

When the cover is closed, the above-described elements are protected from the weather; when open, only the premises wire terminations and test jack are exposed.

The network contacts also incorporate means for fusing, if desired, to protect premises wiring from surges as from lightning. The network contacts further incorporate upstanding tabs for connection to a "ringer" circuit for test purposes.

Other features and objects will be apparent with reference to the drawings and detailed description which follow.

BRIEF DESCRIPTION OF THE DRAWINGS

FIG. 4 is an exploded cross section of the base taken along line 4—4 of FIG. 3 and the contacts.

FIG. 5 is an exploded cross section of the cover and assembled base.

FIG. 6 is a cross section of the assembled connector with the cover in the open position.

FIG. 7 is a perspective of the assembled connector mounted to a wall.

DETAILED DESCRIPTION OF THE PREFERRED EMBODIMENT

Figure 1:
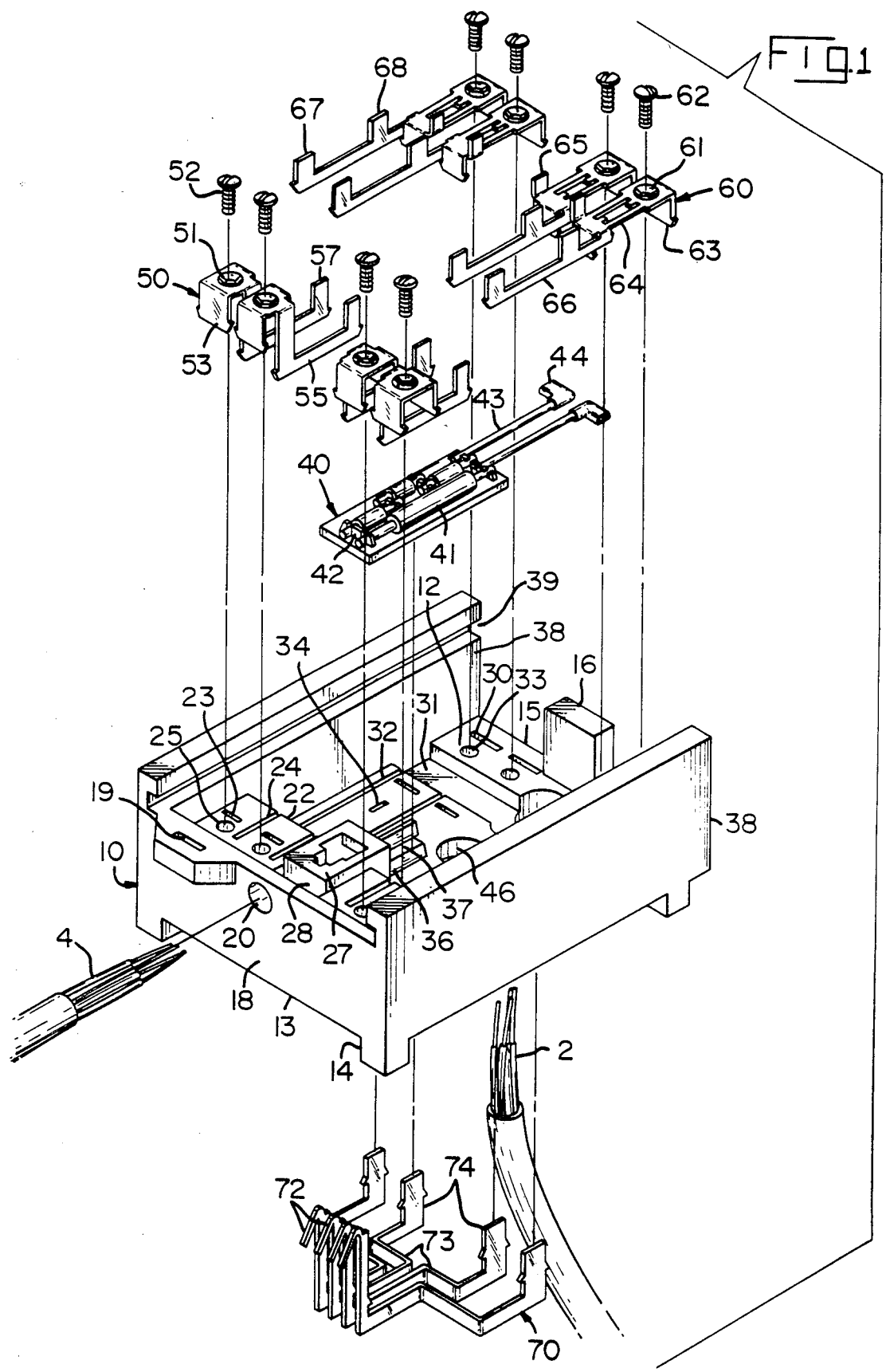
FIG. 1 is an exploded perspective of the base and terminals.

FIG. 1 is an exploded perspective illustrating the base 10, premises contacts 50, network contacts 60, and test contacts 70 which fit therein. The base comprises a first surface 12, an opposed second surface 13, a top end 15, a bottom end 18, and opposed sidewalls 38 having facing parallel slots 39. The premises contacts 50 each have a formed screw hole 51 which acts as a nut for screw 52, a pair of parallel barbed legs 53, a bar 55, and an upstanding first terminal tab 57 at the end of bar 55. The legs 53 are received in an interference fit in slots 23 in pedestal 22 toward the bottom end 18 of base 10. The screws 52 pass freely into holes 25, while bars 55 are received in slots 24 in first surface 12 so that only tabs 57 are exposed from the slots 24. Premises wires 4 are received through hole 20 in bottom end 18 and pass through recess 28 adjacent test jack 27. Network contacts 60 each have a formed screw hole 61 which acts as a nut for screw 62, a pair of parallel barbed legs 63 separated by strips 64, an upstanding ringer terminal 65, a bar 66, and second and the third upstanding terminal tabs 67, 68 at ends of bar 66. The legs 63 are received in an interference fit in slots 30 on opposite sides of channel 31 in first surface 12. The screws 62 pass freely into holes 33, while the bars 66 are received in slots 32 so that only tabs 67, 68 are exposed from slots 32. Network wires 2 are received through hole 46 for termination to screws 62. Test contacts 70 are received in slots in the second surface 13 of base 10 so that fourth terminals 74 are exposed on first surface 12 through slots 34. Spring contacts 72 are received in jack 27, and are connected to tabs 74 through bars 73 having right angle bends.

Note that all contacts 50, 60, 70 are stamped from sheet metal such as brass. The premises contacts 50 are stamped identically, but formed oppositely. The network contacts 60 are also stamped identically but formed oppositely. The test contacts 70 are stamped in two sizes. All contacts 50, 60, 70 are provided with barbs for retention in base 10.

Base 10 also comprises a pair of flanges 36 upstanding from first surface 12. The flanges 36 have facing slots 37 profiled to receive circuit board 40. The board 40 has components 41 mounted thereto by wire-in-slot type terminals 42, and wires 43 extending therefrom for connection to ringer terminals 65 by means of terminals 44.

Figure 2:
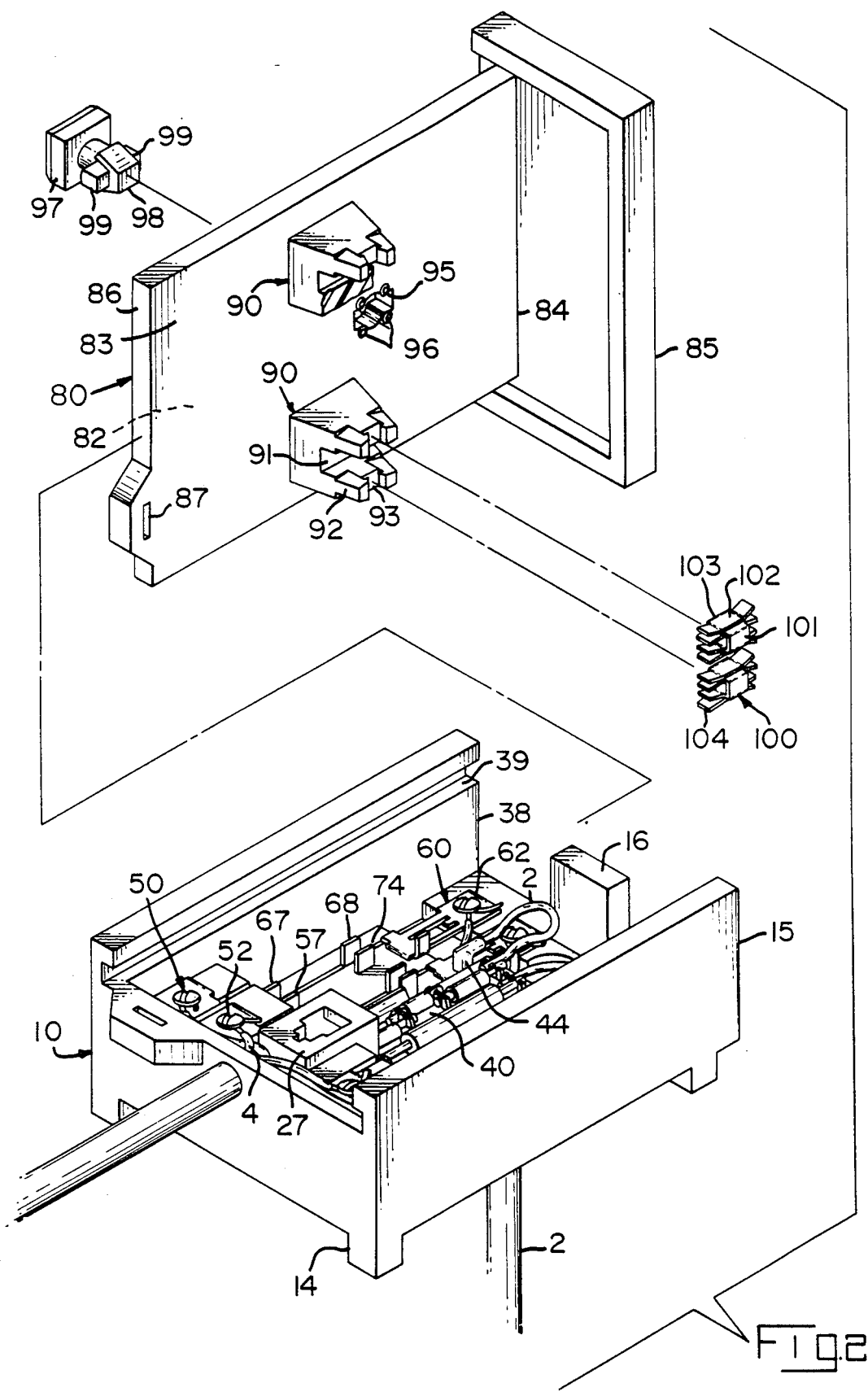
FIG. 2 is an exploded perspective of the cover and the assembled base.

FIG. 2 shows the elements described in conjunction with FIG. 1 assembled to base 10. First and second terminals 57, 67 lie in a first row which parallels third and fourth terminals 68, 74 lying in a second, parallel row. Each first terminal 57 lies directly opposite and coplanar with a fourth terminal 74, while each second terminal 67 lies directly opposite and coplanar with a third terminal 68. The network wires 2 are secured to terminals 60 by screws 62 while the premises wires 4 are secured to terminals 50 by screws 52.

Cover 80 comprises a first surface 82, an opposed second surface 83, a flanged top endwall 85, and an opposed bottom edge 86 having a lock slot 87. The cover 80 has stanchions 90 upstanding from second surface 83; each stanchion 90 comprises two supports 92 separated by a channel 91. The supports 92 each have a latching recess 93 profiled to receive the bridge 101 of a stamped and formed bridging contact 100 in a snap fit. Each bridging contact 100 has two pairs of sidewalls 102 which are received against opposite sides of a support 92 of a stanchion. The sidewalls 102 in each pair are connected by a bight toward second surface 83, and have free end portions 104 which are flared apart to facilitate mating one of terminal tabs 57, 67, 68, 74. After the bridging contacts 100 are assembled to cover 80, the cover is assembed to the base 10 by sliding it into opposed slots 39 from top end 15. Stanchions 90 pass on either side of barrier wall 16, and knob 97 is subsequently assembed to cover 80 by inserting stop member 98 through keyhole 95 with the lock arms 99 oriented as shown. The knob 97 is then rotated ninety degrees to rotate lock arms in interference over nubs 96 on second surface 83, which locks the knob 97 and integral stop member 98 in place.

Figure 3:
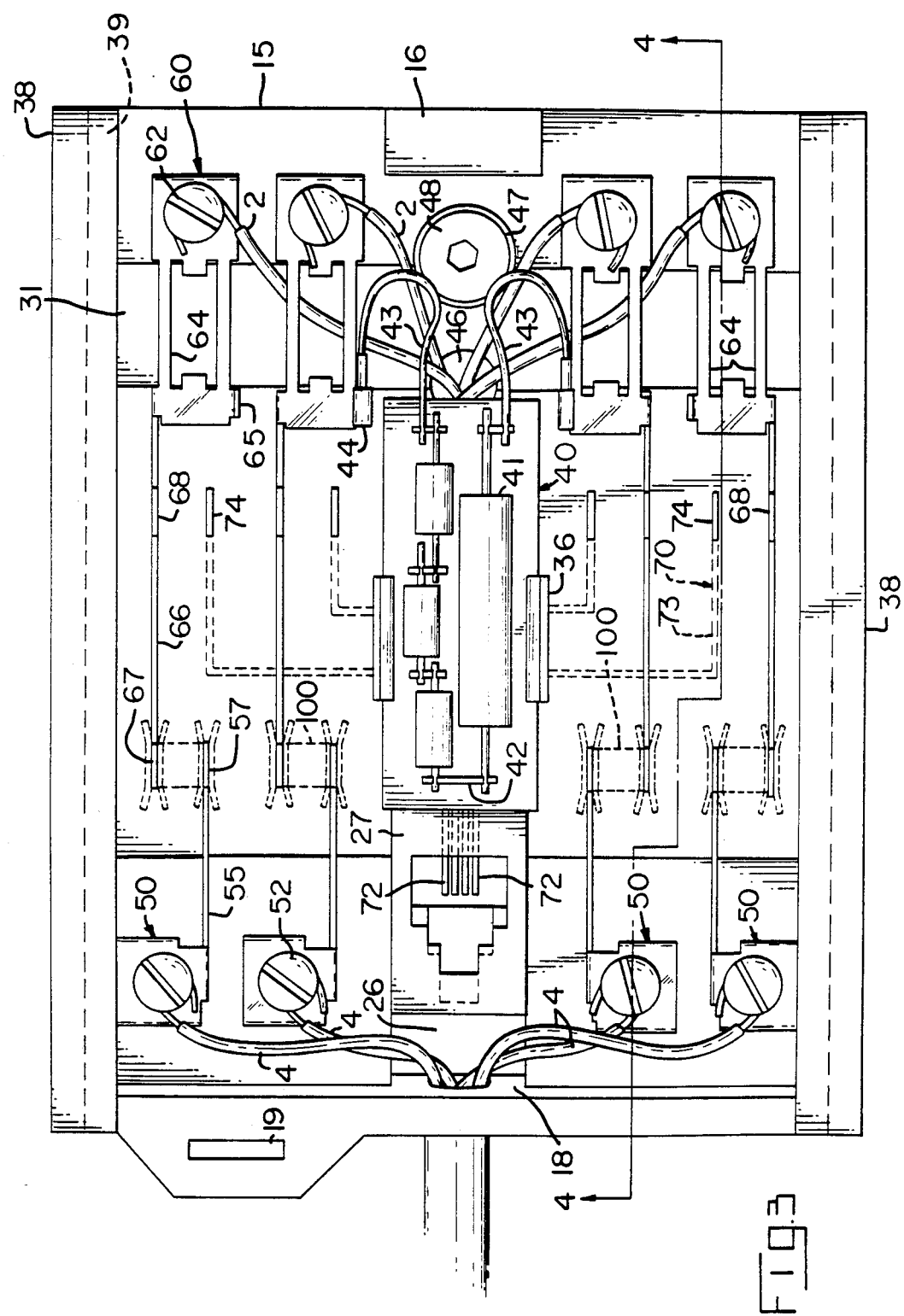
FIG. 3 is a plan view of the assembled base with the bridging contacts shown in phantom.

FIG 3 is a plan view of the base 10 with contacts 50, 60, 70 fixed therein, and wires 2, 4 terminated to terminals 60, 50 by screws 62, 52 respectively. The bridging contacts 100, shown in phantom, are shown as they would be with the cover 80 (FIG. 2) in the closed position, so that each first terminal 57 is electrically connected to an adjacent second terminal 67. When the cover 80 is slid upward to expose jack 27, the bridging contacts 100 move upward therewith until they connect third terminals 68 with fourth terminals 74, which are in pairs spaced as terminals 57, 67. The bridging contacts 100 thus act as throwing elements which, by translation of the cover, switch the device from a first closed position, where network wires 2 are connected to premises wires 4, to a second closed position, where network wires 2 are connected to spring contacts 72 in jack 27. This is possible because terminals 68 are coplanar with terminals 67, and terminals 74 are coplanar with terminals 57. All terminal tabs 57, 67, 68, 74 lie in parallel planes which parallel the sidewalls 102 of bridging contacts 100, which parallel the direction of translation of the cover. Note that while wires 43 are shown connected to the innermost of terminals 60, the terminals 44 may be connected to any of terminals 65 as desired. In the event that fusing of incoming signals is desired, the strips 64 can be severed or removed and the channel 31 bridged by fuses soldered to upper and lower sections of respective terminals 60.

FIG. 4 is a cross section of the base 10 taken along line 4—4 of FIG. 3, and one each of contacts 50, 60, 70 exploded therefrom. Pedestal 22 has planar slots 23 which receive legs 53 of contact 50 and a planar slot 24 which is continuous into first surface 12 for reception of bar 55. Legs 63 of contact 60 are likewise received in slots 30, while bar 66 is received in slot 32. The contact 70 is assembled to base 10 by inserting the bar 73 in slot 35 in second surface 13. The circuit board 40 has been omitted from views 4 to 6 for clarity.

FIG. 5 is a like cross section of base 10 after contacts 50, 60, 70 have been assembled thereto. Second terminal 67 lies in a plane parallel to fourth terminal 74. First terminal 57 (FIG. 3) stands in front of terminal 67 while third terminal 68 stands behind terminal 74. The cover 80 is shown with a bridging terminal 100 in place on stanchion 90; the bridge 90 is snapped into latching recess 93 in one of supports 92.

FIG. 6 is a cross section of the assembled connector with cover 80 assembled thereto. Note that FIG. 3 depicts the bridging contacts 100 with the cover 80 closed so that contacts 57, 67 are connected. FIG. 6 depicts the cover 80 in the open position, so that contacts 68, 74 are connected and jack 27 is exposed for insertion of a modular phone plug 76. Stop member 98, which was assembed to cover 80 after sliding same into slots 39 in sidewalls 38, is shown abutted against barrier 16, which prevents removal of the cover. When the cover is closed, flanged top endwall 85 fits against the barrier 16 and sidewalls 38 to prevent water from entering. Slots 87 and 19 will align to permit application of a seal which would indicate tampering. The wires 2, 4 which would be connected to screws 72, 62 when the interface device is in service have been omitted.

FIG. 7 shows the network interface device of the present invention as mounted on an outside wall 6, which is accomplished by a screw 48 through aperture 47 in the base 10 (FIG. 3). If service is interrupted, the subscriber may readily check whether the fault lies in the phone company network or on his premises by sliding up cover 80 and inserting a plug 76 on his telephone in jack 27 (FIG. 6).

The foregoing is exemplary and not intended to limit the scope of the claims which follow.

I claim:

1. A network interface device for terminating network telephone wiring at a subscriber's premises and for connecting the subscriber's wiring to the network which comprises:

a base having a first surface, an opposed second surface, and means for mounting said base to a fixed surface so that said second surface faces said fixed surface, said base carrying on said first surface a telephone jack having a plurality of spring contacts therein, a like plurality of first terminals upstanding from said first surface in a first row, said first terminals having means for electrically connecting to said subscriber's wiring, a like plurality of second terminals upstanding from said first surface in said first row, said second terminals being electrically connected to said network wiring, each second terminal lying adjacent one of said first terminals to form a like plurality of first pairs, a like plurality of third terminals upstanding from said first surface in a second row paralleling said first row, each said third terminal having means for electrically connecting to a respective second terminal, said third terminals lying opposite said respective second terminals, a like plurality of fourth terminals upstanding from said first surface in said second row, said fourth terminals being electrically connected to said spring contacts, each fourth terminal lying adjacent one of said third terminals to form a like plurality of second pairs, said fourth terminals lying opposite respective first terminals, said second pairs lying opposite respective first pairs, said terminals in each second pair being spaced as said terminals in the opposite first pair, a cover having a first surface and an opposed second surface facing said first surface of said base, said cover being mounted on said base for sliding movement relative thereto in a direction perpendicular to said rows, said cover carrying a like plurality of bridging contacts in a third row parallel to said first and second rows, each bridging contact sliding on a path between opposed pairs, each said bridging contact electrically connecting the terminal in a given pair, whereby, sliding said cover relative to said base moves said bridging contacts from said first pairs to said second pairs and acts as a like plurality of single pole double throw switches, connecting said network wiring to said subscriber's wiring in one closed position and connecting said network wiring to said telephone jack in the other closed position.

2. A network interface device as in claim 1 wherein said first surface of said base is flanked by a pair of parallel opposed upstanding sidewalls perpendicular to said rows, each said sidewall having a slot which faces the opposite sidewall, said slots being parallel to said first surface of said base, said cover being mounted to slide in said slots from a first position where said bridging contacts connect adjacent first and second contacts and said jack is covered, to a second position where said bridging contacts connect adjacent third and fourth contacts and said jack is exposed.

3. A network interface device as in claim 1 wherein said terminals are spade terminals stamped and formed from sheet metal, said first terminals being coplanar with opposed fourth terminals, said second terminals being coplanar with opposed third terminals, said bridging contacts each being stamped and formed from sheet metal, each bridging contact comprising a pair of parallel slots formed in said sheet metal and spaced to engage adjacent first and second contacts, each slot being coplanar with opposed spade terminals, each slot being formed with a pair of substantially parallel walls connected at a bight and resiliently biased toward each other to resiliently engage a spade terminal.

4. A network interface device as in claim 3 wherein said second and third terminals are formed from a single piece of stamped sheet metal.

* * * * *